United States Patent [19]
Van Ommeren et al.

[11] Patent Number: 5,790,067
[45] Date of Patent: Aug. 4, 1998

[54] JAM-RESISTANT RADAR APPARATUS WITH PHASE SHIFT PROVISIONS

[75] Inventors: Marinus Josephus Servatius Van Ommeren, Borne; John Arthur Scholz, Hengelo, both of Netherlands

[73] Assignee: Hollandse Signaalapparaten B.V., Hengelo, Netherlands

[21] Appl. No.: 765,175

[22] PCT Filed: Jun. 22, 1995

[86] PCT No.: PCT/EP95/02424

§ 371 Date: Jan. 13, 1997

§ 102(e) Date: Jan. 13, 1997

[87] PCT Pub. No.: WO96/02852

PCT Pub. Date: Feb. 1, 1996

[30] Foreign Application Priority Data

Jul. 13, 1994 [NL] Netherlands ............... 9401157

[51] Int. Cl.⁶ .................................................. G01S 7/36
[52] U.S. Cl. ................................................ 342/17; 342/102
[58] Field of Search ................................. 342/13, 16, 17, 342/18, 19, 102, 162, 189, 203

[56] References Cited

U.S. PATENT DOCUMENTS

| | | | |
|---|---|---|---|
| 3,916,408 | 10/1975 | Evans et al. | 342/62 |
| 3,921,171 | 11/1975 | Strother, Jr. et al. | 342/150 |
| 3,947,847 | 3/1976 | Felsenthal, Jr. | 342/16 |
| 3,971,021 | 7/1976 | Cann | 342/15 |
| 4,117,484 | 9/1978 | Shizume | 342/15 |
| 4,359,736 | 11/1982 | Lewis | 342/16 |
| 4,513,383 | 4/1985 | Hackett, Jr. | 364/517 |
| 4,544,926 | 10/1985 | Giuli | 342/19 |
| 5,237,328 | 8/1993 | Dorey et al. | 342/13 |
| 5,260,707 | 11/1993 | Goldman | 342/16 |
| 5,323,103 | 6/1994 | Choate et al. | 324/76.22 |
| 5,359,329 | 10/1994 | Lewis et al. | 342/17 |
| 5,365,234 | 11/1994 | Lewis | 342/16 |
| 5,539,407 | 7/1996 | Scholz | 342/17 |

*Primary Examiner*—John B. Sotomayor
*Attorney, Agent, or Firm*—Oblon, Spivak, McClelland, Maier & Neustadt, P.C.

[57] ABSTRACT

Radar apparatus provided with a transmitting unit (1), having a transmit phase shifter for providing each transmitted pulse in a burst with a selected phase shift, and a receiving unit (7), having a receive phase shifter (9) for cancelling the selected phase shift upon reception. This enables unimpeded radar transmissions and causes an operational repeater jammer to be misled.

12 Claims, 1 Drawing Sheet

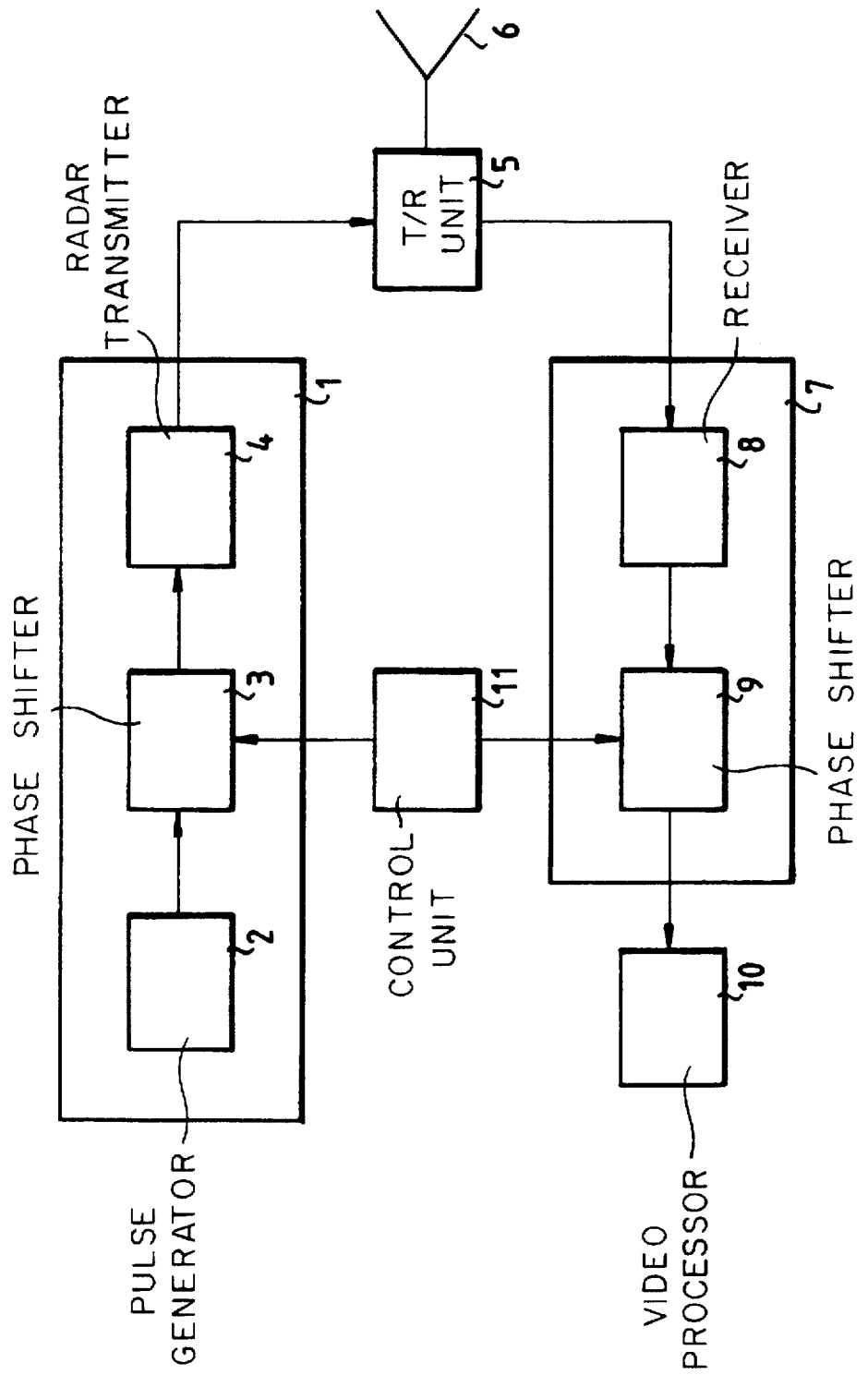

JAM-RESISTANT RADAR APPARATUS WITH PHASE SHIFT PROVISIONS

The invention relates to a radar apparatus for the coherent transmission and reception of radar pulses, provided with a transmitting unit having a transmit phase shifter, a receiving unit and a video processor for the processing of received radar echoes.

A radar apparatus of this kind is known from FR-A 2.455.288. In this known apparatus the phase shifter is used for phase shifting an individual radar pulse a number of times during that pulse in a well defined manner. Received radar echo pulses are autocorrelated with the transmitted pulse, resulting in a compressed echo pulse with an increased range resolution and an increased signal to noise ratio.

The present invention does not aim at compressing the echo pulses but at generating misleading information for a repeater jammer that might be active. A repeater jammer is adapted for deliberately generating interference with a jamming transmitter that is capable of producing a replica of a received radar pulse. For that purpose the repeater jammer stores the first received pulse of a burst of radar pulses in a memory and subsequently uses this stored pulse for the generation of a burst of simulated radar echo pulses representing a simulated target, as a result of which the video processor is incapable of distinguishing the simulated target from a true target. By subsequently manipulating the simulated radar pulses, the jammer may constitute a serious threat to the operational effectiveness of the radar apparatus.

The present invention intends to make a repeater jammer less effective and is characterised in that the transmitting unit is adapted for transmitting bursts of radar pulses, that the transmit phase shifter is adapted for phase shifting individual transmitted radar pulses within a burst with a selected phase shift, that the receiving unit is provided with a receive phase shifter, for providing the received echo of a radar pulse with a reverse of the phase shift selected for that radar pulse on transmission.

Since the selected phase shift is completely cancelled in the received radar pulses, the coherence remains unaffected and the overall effectiveness of the radar apparatus remains unchanged. On the contrary, received simulated radar pulses, derived from the first pulse in a burst have a phase shift that corresponds to the inverted selected phase shift, because the receiving unit in fact compensates for a non-applied selected phase shift.

A first embodiment of the radar apparatus is characterised in that the video processor is provided with a correlator for correlating the phase of radar pulses in a received burst with the phase in a transmitted burst, for generating a signal which indicates whether a repeater jammer is operational, which signal can subsequently be used to prevent a radar track from being based on the simulated target.

Repeater jammers of greater sophistication have means for providing transmissions with a pulse-to-pulse increasing or decreasing phase, on the basis of the first pulse in a burst, which means enable the simulation of a target having a certain velocity. The use of a correlator will then no longer be sufficient. A favourable embodiment of the invention is thereto characterised in that the video processor is provided with a Doppler filterbank for determining velocities of possible targets and in that the phase shift realizes a selected distribution of received repeater jammer pulses over the Doppler filterbank outputs.

In a first realization of this embodiment, the phase shift is selected for obtaining an at least substantially even distribution of received repeater jammer pulses over the Doppler filterbank outputs. The received jammer signals are in a manner of speaking spread over the Doppler domain, after which real targets may be searched by means of a threshold circuit connected to the Doppler filterbank outputs.

In a second realization of this embodiment, the phase shift is selected for at least substantially routing of received repeater jammer pulses to a previously determined Doppler filterbank output. A preferable choice in this respect would be a Doppler filterbank that is of minor relevance, for instance an output that represents a target velocity corresponding to a target that moves away from the radar apparatus.

An exceptionally favourable embodiment of the invention is obtained for a phased array radar apparatus incorporating a plurality of phased array elements, each provided with at least one phase shifter. It is then possible to realize the selected phase shift per array element by means of the at least one phase shifter, thus rendering the incorporation of hardware unnecessary. For transmission, the at least one phase shifter is controlled with a phase shift required for the functioning of the phased array, increased by the selected phase shift and for reception with a phase shift required for the functioning of the phased array, decreased by the selected phase shift.

BRIEF DESCRIPTION OF THE DRAWING

FIG. 1 is a block diagram schematically representing a radar apparatus according to the present invention.

The invention will now be described in more detail with reference to FIG. 1, which figure schematically represents a radar apparatus according to the invention.

FIG. 1 schematically represents a radar apparatus according to the invention, in which bursts of radar pulses are generated in a transmitting unit 1 by pulse generator 2 and each radar pulse can be provided with a phase shift by phase shifter 3, after which the transmitter pulses are applied to antenna 6 via radar transmitter 4 and T/R unit 5. Radar echoes received by antenna 6 are via T/R unit 5 applied to receiving unit 7, which comprises a radar receiver 8 well-known in the art, followed by a phase shifter 9.

The output signal of phase shifter 9 is applied to a video processor 10. Both phase shifters 3, 9 are controlled from a control unit 11 that is designed such that the phase shift of phase shifter 9 is always the reverse of the phase shift of phase shifter 3. If the phase shifters 3, 9 can for instance be controlled digitally, such can easily be effected by inverting the digital word used for controlling phase shifter 3 and by applying this signal to phase shifter 9. The invention can also be realized on the basis of only one phase shifter, which may be connected by means of two switches to either the transmitting unit 1 or the receiving unit 7. Also in this case the control unit 11 is required to control the phase shifter such that, in accordance with the inventive principle, a phase shift applied during transmission is compensated for.

This pulse-to-pulse variation of the phase of the transmitted signal and the shifting back of the received echo signal does not positively or negatively affect the functioning of the radar apparatus as such.

This will be different if a repeater jammer stores the first pulse in a burst and subsequently uses this pulse for generating an echo signal representing a simulated target. In this case the phase shifter 9 will provide the individual pulses in the burst with a known phase shift. In video processor 10 that combines the radar echoes of a burst per target, as is customary in the art, it is easily ascertainable that the burst pertaining to the simulated target possesses the known modulation. A suitable method would be to correlate, for each burst received, the phase of the individual pulses with the known phase applied by phase shifter 9. If the phase shift applied by phase shifter 9 is restricted to the inversion or not of the phase of received radar pulses, video processor 10 can be implemented with a digital correlator well-known in the art, which keeps down the required hardware to a minimum.

An intelligent repeater jammer retransmits the first pulse in a burst with a phase that varies per pulse, with the aim to simulate a target having a given velocity. A correlator of non-complex design will then no longer be capable of identifying a simulated target. In that case, advantageous use can be made of a Doppler filterbank that in modern radar systems is usually integrated in video processor 10. Two procedures can be followed to minimize the drawback the repeater jammer entails for the radar apparatus.

The first procedure involves an equal distribution of the simulated radar pulses over all outputs of the Doppler filterbank. As well-known in the art, the outputs of a Doppler filterbank are applied to a threshold circuit, whose threshold values are selected such as to limit the number of false alarms. An increase of the received signal at all Doppler filterbank outputs simultaneously will generally result in an integral increase of the threshold values. This will render the radar apparatus to be slightly less sensitive, but prevents false target signals from appearing at the video processor output. A most effective method for spreading the simulated radar pulses is to provide the successively transmitted radar pulses with a pseudo-randomly selected phase. The effect of such a burst provided with pseudo-random phase modulation can be easily simulated for a certain type of Doppler filterbank. It is of advantage in this respect that a phase modulation effected by the repeater jammer does not substantially affect the equal distribution (of simulated radar pulses) over the different Doppler filter outputs. If biphase codes are the only options considered, Barker codes or Barker-like codes prove to be advantageous, the Barker codes being limited to a length that matches the length of the burst.

The second procedure comprises the routing of the simulated radar pulses to a Doppler filterbank output to be selected. This output is then selected such that a target contained therein is of relatively minor importance, such as for instance zero-velocity targets. This would of course be without any result, because with the phase shifters 3, 9 being unused, the repeater jammer will have full scope. A better alternative is to select an output that corresponds to a negative target velocity associated to a target that moves away from the radar apparatus. Such a target does not constitute a serious threat. If the Doppler filterbank is designed for measuring velocities ranging from −Vmax to +Vmax, Vmax being for instance 900 m/s, it is possible to select the phase modulation applied by phase shifter 3 such that a target simulated by a repeater jammer without Doppler velocity enters a filter output matching −Vmax/2, consequently −450 m/s. This ensures that all simulated targets having a simulated Doppler velocity ranging from −Vmax/2 to +Vmax/2 end up in the negative velocity range, a velocity range that does not pose a serious threat. It will be entirely clear that this is accomplished by a phase modulation that increases by 90 degrees per transmitted pulse, as a result of which the received simulated pulses will decrease by 90 degrees, as modulated by phase shifter 9.

In case of a phased array radar apparatus, provided with a plurality of phased array modules, it can be averred that the radar apparatus schematically represented in FIG. 1 can be advantageously applied to each module, with the exception of video processor 10, which in case of a phased array antenna will be shared by all modules. Occasionally, modules are provided with only one phase shifter used for both transmission and reception, but this has no effect on the operational effectiveness of the radar apparatus according to the invention, provided that this single phase shifter is properly controlled during transmission and reception.

By analogy with the above description, phase shifter 3 provides a selected phase shift at the transmitted radar pulses. It should be noted though that the true function of phase shifter 3 is the formation and steering of a radar beam. This radar beam does however not change, if a selected phase shift is added to all phase shifters 3. This can be simply realized in a beam steering computer, not shown here, which substitutes control unit 11. This beam steering computer is a standard accessory in a phased array antenna. The phase shift can similarly be cancelled upon reception, by subtracting the selected phase from the settings of phase shifters 9, calculated for each module by the beam steering computer.

We claim:

1. Radar apparatus for the coherent transmission and reception of radar pulses, provided with a transmitting unit (1) having a transmit phase shifter (3), a receiving unit (7) and a video processor (10) for the processing of received radar echoes, characterised in that the transmitting unit (1) is adapted for transmitting bursts of radar pulses, that the transmit phase shifter (3) is adapted for phase shifting individual transmitted radar pulses within a burst with a selected phase shift, that the receiving unit (7) is provided with a receive phase shifter (9), for providing the received echo of a radar pulse with a reverse of the phase shift selected for that radar pulse on transmission.

2. Radar apparatus as claimed in claim 1, characterised in that one phase shifter is provided that is connected to the transmitting unit (1) during transmission and to the receiving unit (7) during reception.

3. Radar apparatus as claimed in claim 1, characterised in that the video processor (10) is provided with a correlator for correlating the phase of radar pulses in a received burst with the phase in a transmitted burst, for generating a signal which indicates whether a repeater jammer is operational.

4. Radar apparatus as claimed in claim 1, characterised in that the video processor (10) is provided with a Doppler filterbank for determining velocities of possible targets and in that the phase shift realizes a selected distribution of received repeater jammer pulses over the Doppler filterbank outputs.

5. Radar apparatus as claimed in claim 4, characterised in that the phase shift is selected for obtaining an at least substantially even distribution of received repeater jammer pulses over the Doppler filterbank.

6. Radar apparatus as claimed in claim 4, characterised in that the phase shift is selected for at least substantially routing of received repeater jammer pulses to a previously determined Doppler filterbank output.

7. Radar apparatus as claimed in claim 6, characterised in that the previously determined Doppler filterbank output represents a negative target velocity.

8. Radar apparatus as claimed in claim 5, characterised in that the radar apparatus is a phased array type of radar, comprising a plurality of phased array transmit/receive elements, each provided with at least one phase shifter, the at least one phase shifter also providing the selected phase shift.

9. Radar apparatus as claimed in claim 8, characterised in that for transmission, the at least one phase shifter is controlled with a phase shift required for the functioning of the phased array, increased by the selected phase shift and in that for reception, the at least one phase shifter is controlled with a phase shift required for the functioning of the phased array, decreased by the selected phase shift.

10. Radar apparatus as claimed in claim 2, characterized in that the video processor is provided with a correlator for correlating the phase of radar pulses in a received burst with the phase in a transmitted burst, for generating a signal which indicates whether a repeater jammer is operational.

11. Radar apparatus as claimed in claim 2, characterized in that the video processor is provided with a Doppler filterbank for determining velocities of possible targets and in that the phase shift realizes a selected distribution of received repeater jammer pulses over the Doppler filterbank outputs.

12. Radar apparatus as claimed in claim 7, characterized in that the radar apparatus is a phased array type of radar, comprising a plurality of phased array transmit/receive elements, each provided with at least one phase shifter, the at least one phase shifter also providing the selected phase shift.

* * * * *